United States Patent Office
3,476,596
Patented Nov. 4, 1969

3,476,596
MAGNETIC TAPE

John F. Carroll, Jr., Rochester, N.Y., assignor to Eastman Kodak Company, Rochester, N.Y., a corporation of New Jersey No Drawing. Filed Dec. 28, 1966, Ser. No. 605,222
Int. Cl. G03g *19/00*
U.S. Cl. 117—239 3 Claims

ABSTRACT OF THE DISCLOSURE

A magnetic recording tape comprising a carrier with a coating of magnetizable powder and a thin, lubricant coating of mixed molybdenum disulfide and graphite particles on top of the magnetizable powder.

The present invention relates to magnetic tape of improved recording and reproducing characteristics. It is also concerned with a novel method for making such improved magnetic tape, and to a method for operating such tape in recording and reproducing operations.

When smooth magnetic tapes are used to record or play back very short wavelengths of high frequency, it has been noticed that there is a progressively worsening attenuation or weakening of high frequencies, probably due to continuous modification of the magnetic transducer surface as the tape passes in contact with the pole pieces. This has become known as "stippling," and is particularly noticeable when the ambient atmosphere has a low relative humidity, such as 5%, the effect diminishing gradually toward 50% relative humidity. Stippling can be eliminated temporarily by lapping the transducer surface with a lapping tape or other abrasive medium, but the same progressive signal deterioration will become apparent again upon routine use of the transducer head in contact with moving tape.

The cause of high frequency attenuation has not been established with certainty, but it is believed to result from non uniform contact of the tape with the polepieces, and even some separation of areas of the polepieces from the tape, due to a combination of three observable changes:

(1) The high permeability polepiece alloy (e.g., 79% nickel, 5% molybdenum, 16% iron) is cold worked at its surface by contact with the moving tape, acquiring a low permeability skin.

(2) Iron oxide and organic binder are physically impregnated into the surface of the polepiece, modifying the surface composition.

(3) The polepiece surface becomes roughened and less capable of intimate uniform contact with the tape surface.

While the term "stippling" is used to designate the attenuation phenomenon, it is also literally descriptive of the physical condition of the polepieces as described above.

Graphite has been applied to the surface of magnetic tape without reducing stippling at 5% humidity, and it even increased stippling at higher humidities such as 50% (probably by decreasing abrasiveness, with consequent failure to renew the metal surface).

A partial solution to this problem of stippling can be secured by applying molybdenum disulfide as colloidal size powder to the side of the tape carrying the magnetic powder. Molybdenum disulfide effectively reduced stippling at humidities between 5 and 50% but, surprisingly, at the higher humidities around 50% it undesirably increased the abrasiveness and friction of the tape in contact with the head and increased the power required to drive the tape. Furthermore, the temperature of the tape rose considerably due to the friction. At 5% humidity, on the other hand, the tape was not very abrasive. Thus the mechanism of stippling control was not based on its abrading characteristics. These findings were quite unexpected because molybdenum disulfide is generally thought of as a lubricating material in mechanical devices.

I have found, surprisingly, that the disadvantages of molybdenum disulfide are eliminated while retaining the advantages by also applying powdered graphite of colloidal size to the same surface of the tape, even though graphite alone is ineffective or even detrimental to stippling improvement. Advantageously, the graphite is mixed intimately with the powdered molybdenum disulfide on the magnetic layer, the two being applied together as a mixture suspended in a vaporizable solvent which is deposited on top of the magnetic layer. The resulting tape was no more abrasive at 50% humidity than a tape which had no overcoating, yet stippling was effectively controlled at low and high humidities. The important improvement I have devised was completely unobvious from the behaviors of the individual components, as one could have expected to retain in the mixture the undesirable features of the components, namely higher abrasiveness, greater tape wear and higher friction for molybdenum disulfide; and a greater tendency to stipple at 50% relative humidity for graphite.

I am aware of British Patent 868,346 which describes the application of molybdenum disulfide to a magnetizable layer of magnetic tape for the purpose of producing a low noise level when reproducing recorded pulses. According to that patent, a high noise level results from vibration which may occur in the tape while being fed past the recording and reproducing heads. It, however, does not recognize the problem of stippling, with which I am concerned, nor does it suggest a solution to that problem.

I am also aware of Cousino's U.S. Patent 2,804,401 which relates to magnetic tape having a coating of graphite, but this patent teaches only the lubricating character of the graphite and does not suggest any deficiency in the use of molybdenum disulfide, nor how one might overcome such deficiency.

More specifically in accordance with the invention, a magnetic recording tape may comprise one of the conventional carrier materials such as cellulose acetate, polyvinyl chloride, polyvinyl acetate, vinyl-chloride-vinyl-acetate-copolymer, polyamides, or polyethylene terephthalate (commonly known as Estar or Mylar tape).

The magnetizable powder may be conventional, such as ferric oxide, or iron, or an iron alloy such as iron-nickel-cobalt. Ordinarily, the magnetizable powder is applied to the carrier body by suspending the powder in a solution consisting of a binder in a volatile organic solvent, with the suspension being spread as a thin layer onto the carrier with the aid of a metering device, after which the solvent is allowed to evaporate. Reference is made to U.S. Patent 2,607,710 for a description of how the base magnetic tape can be prepared.

In accordance with my invention, the magnetizable layer is then overcoated with a very thin, visually almost imperceptible layer comprising a mixture of molybdenum disulfide and graphite powders of colloidal size (between $10^{-4}$ and $10^{-6}$ centimeter). The overcoating is accomplished by suspending the two powders in a volatile vaporizable organic solvent liquid, with or without a binder material, and then applying the suspension to the magnetic tape by spraying, or dipping the tape into a suspension, or spreading the suspension onto the tape in a manner similar to the initial coating of the magnetic layer. The solvent is then allowed to evaporate, leaving an extremely thin but highly effective layer of mixed graphite and molybdenum disulfide powders.

The preferred proportions of molybdenum disulfide and graphite are 2 to 1 by weight, (1 to 1 by volume), and a 1 to 1 mixture by weight has been quite effective. Generally speaking, effective results can be secured by varying the weight proportions within the range of about 1 part molybdenum disulfide to 3 parts of graphite, and 6 parts of molybdenum disulfide to 1 part of graphite.

The proportion of the mixed powders in the carried liquid is advantageously about 2.5 parts by weight to 100 parts of solvent by weight, but effective results can be obtained by varying the proportions within the range of 0.25 part to 10 parts of mixed powders to 100 parts of solvent. Care should be taken to distribute the dispersion over the tape in such quantity as to provide the finished product with between 0.002 and 0.05 milligram of the dry powder mixture per square foot of tape surface.

Any conventional volatile solvent material which does not react with or coagulate the molybdenum disulfide or the graphite, and which does not attack the magnetic dispersion layer or otherwise adversely affect the coated tape can be used effectively. One suitable solvent comprises a mixture of 3½ parts of methanol to 1 part of isopropyl alcohol by volume. Other useful solvents are cyclohexane, toluene, acetone, methyl isobutyl ketone, and various combinations with one another and with methanol and isopropyl alcohol.

It is desirable from the frequency response standpoint to have as little foreign material on the surface as possible, commensurate with the necessary reduction in stippling. The best combination of characteristics is secured when the powder mixture appears as a thoroughly separated distribution of powder particles scattered along the surface, (instead of appearing as a discrete continuous layer), with the basic magnetic oxide layer showing clearly on the surface when viewed under a microscope. Advantageously, the graphite-molybdenum disulfide in the finished product should be present in an amount between 0.002 and 0.050 milligram per square foot of tape surface.

EXAMPLE

A dispersion was made containing 1.25 parts by weight of molybdenum disulfide and 1.25 parts by weight of graphite in 100 parts by weight of a vaporizable solvent consisting of 3½ parts by volume of methanol and 1 part by volume of isopropyl alcohol. The molybdenum disulfide and the graphite had a fineness of colloidal size. This dispersion was then applied on the top of an iron oxide coating on a Mylar tape by metering it through a narrow slot at a rate of 2 milliliters per quare foot of tape, after which the solvent was permitted to evaporate leaving a coating of mixed molybdenum disulfide and graphite powders on top of the magnetic layer. The coating was not a distinct layer and was hardly perceptible to the naked eye despite the black opacity of the dispersion.

The resulting tape was tested along with a non top-coated, but otherwise identical, control tape; identical tape top-coated with pure graphite, and identical tape top-coated with pure molybdenum disulfide. Each coated tape was top coated at the same rate from dispersions having the same concentration described above, i.e., 2.5 parts by weight of powder to 100 parts by weight of solvent.

The tape coated with pure molybdenum disulfide showed increased abrasiveness at 50% relative humidity, which was more than twice that of the control tape without any top coating, and also showed an unexpectedly strong tendency to produce black tape wear products. However, this tape did exhibit a substantial reduction in stippling at both 5% and 50% relative humidities.

The tape with a pure graphite top coat exhibited stippling even at 50% relative humidity, but the abrasiveness was greatly reduced to less than half that of the control tape having no top coat.

The tape top-coated with a mixture of molybdenum disulfide and graphite, exhibited an abrasiveness rating the same as the control tape having no top coating, and generated almost no wear products. Furthermore, stippling was eliminated even at 5% relative humidity where tape abrasiveness was undetectable.

The effect of the relative humidity in the atmosphere where the tape is being used is important because magnetic tape may be used under climatic conditions varying widely both as to temperature and humidity. At high humidity, such as 35–50% relative humidity, the problem of stippling is not series with unmodified tape, but there is undesirably high abrasiveness of tape as it passes over the head. Reduced humidity reduces abrasiveness and increases stippling.

To summarize, at 5% relative humidity molybdenum disulfide alone eliminates stippling and exhibits essentially no abrasiveness, but the friction of the tape passing over the magnetic head is increased quite measurably (resulting in a substantial temperature rise in the tape). At 50% relative humidity the pure molybdenum disulfide shows greatly increased abrasiveness, more than twice that of the control tape, but stippling is well controlled. The tape with a pure graphite top coat exhibits stippling at both high and low humidities.

The mixtures of graphite and molybdenum disulfide, on the other hand, controls stippling satisfactorily both at 5% and 50% relative humidity while eliminating undesirable friction and abrasiveness. In other words, the combination of graphite and molybdenum disulfide combines the desirable characteristics of each while unexpectedly eliminating the disadvantages of each. Therefore, my invention has established the best conditions in the tape to accommodate it for widely varying climatic conditions.

Although the invention has been described in considerable detail with reference to certain preferred embodiments thereof, it will be understood that variations and modifications can be effected without departing from the spirit and scope of the invention as described hereinabove and as defined in the appended claims.

I claim:

1. A magnetic recording tape comprising
a carrier body;
a magnetizable layer of magnetizable powder in a binder carried on said carried body; and
a thin coating consisting essentially of mixed molybdenum disulfide and graphite particles of colloidal size on the top of said magnetizable layer, said mixed particles being present on said layer in an amount between 0.002 and 0.050 milligram per square foot of tape surface, the proportions in said coating being in the range between 1 part of molybdenum disulfide to 3 parts of graphite and 6 parts of molybdenum disulfide to 1 part of graphite, by weight.

2. A magnetic recording tape in accordance with claim 1 wherein the proportions in said coating are 1–2 parts of molybdenum disulfide to 1 part graphite by weight.

3. A magnetic recording tape in accordance with claim 1 wherein said magnetizable powder is ferric oxide.

References Cited

UNITED STATES PATENTS

| | | | |
|---|---|---|---|
| 2,804,401 | 8/1957 | Cousino. | |
| 3,041,196 | 6/1962 | Stella. | |
| 3,051,586 | 8/1962 | Heath et al. | 252—30 X |
| 3,384,584 | 5/1968 | Groszek | 252—30 |

FOREIGN PATENTS

| | | |
|---|---|---|
| 868,346 | 5/1961 | Great Britain. |

MURRAY KATZ, Primary Examiner

B. PIANALTO, Assistant Examiner

U.S. Cl. X.R.

117—240